Figure 3:
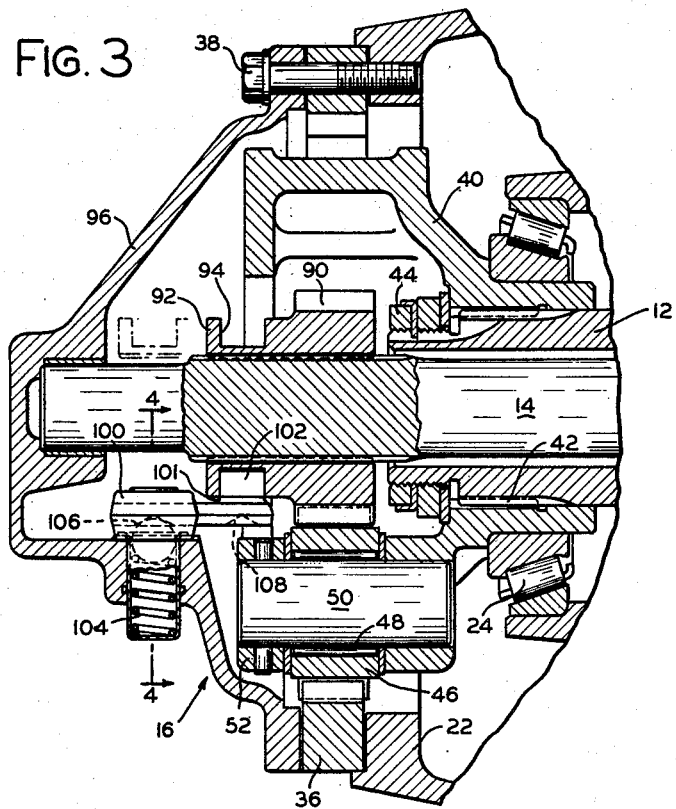

May 25, 1965     M. E. DREITZLER     3,184,985
REDUCTION DRIVE WHEEL
Filed May 19, 1961                                              2 Sheets-Sheet 1
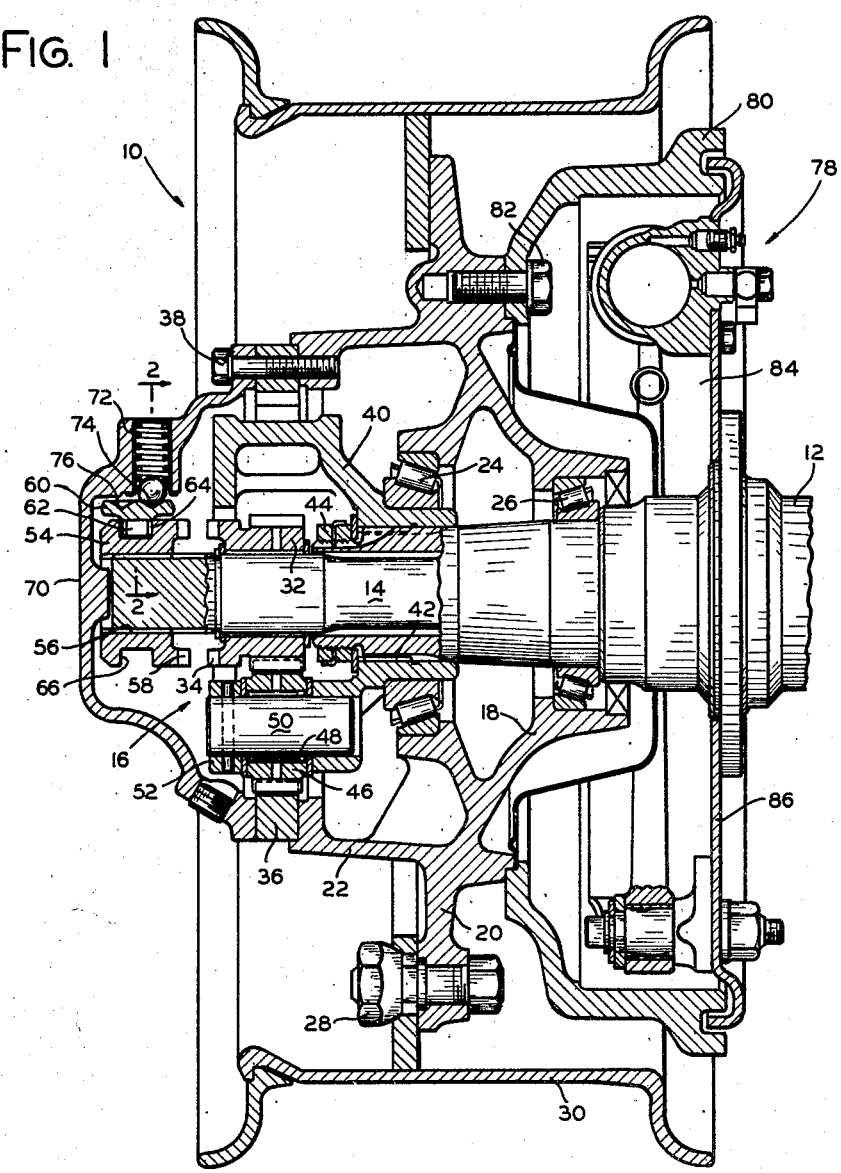
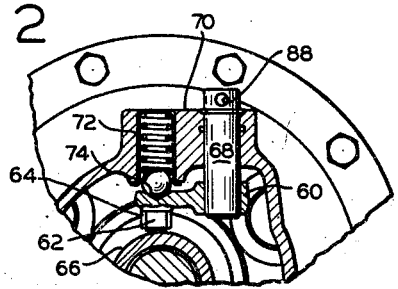
INVENTOR.
MELVIN E. DREITZLER
BY
Kenneth C. Witt
ATTORNEY May 25, 1965  M. E. DREITZLER  3,184,985
REDUCTION DRIVE WHEEL
Filed May 19, 1961  2 Sheets-Sheet 2

INVENTOR.
MELVIN E. DREITZLER
BY Kenneth C. Witt
ATTORNEY

United States Patent Office 3,184,985
Patented May 25, 1965

3,184,985
REDUCTION DRIVE WHEEL
Melvin E. Dreitzler, Buchanan, Mich., assignor to Clark Equipment Company, a corporation of Michigan
Filed May 19, 1961, Ser. No. 111,288
4 Claims. (Cl. 74—377)

This invention relates to the outer end and wheel construction of reduction drive axles, which are drive axles having a gear reduction mechanism interposed between each axle drive shaft and its respective wheel and located within the confines of the wheel. The wheels of such an axle may be referred to as reduction drive wheels.

Such axles are generally known and have been in use for a considerable period for heavy-duty vehicles such as fork trucks, construction machinery and the like, and they are very advantageous for such applications because they minimize the torque which must be transmitted by the axle drive shafts by providing the final gear reduction (and torque multiplication) in the wheels. Ordinarily the heavy-duty vehicles for which such axles are used operate at relatively slow speeds. Recently it has become the practice in many sections of the country to tow a fork truck behind a highway truck carrying a load of cargo in order to have the fork truck available for unloading the highway truck when the latter reaches its destination. Such a practice frequently is followed in the building materials business where highway trucks are loaded at the yard with lumber and other building materials by means of a fork truck. The fork truck is towed behind the highway truck to the building site where the fork truck is then utilized to unload the highway truck, and on the return trip the highway truck again tows the fork truck behind it back to the yard.

Such fork trucks are heavy-duty vehicles and many of them are equipped with reduction drive axles and wheels. The normal top speed of such a fork truck when operating under its own power may be only 20 to 25 miles per hour whereas the top speed of the highway truck may be 50 to 60 m.p.h. or more. This means that when a highway truck tows the fork truck that the axle shafts and other parts of the drive train of the latter are caused to operate at much more than their normal maximum speed. Also, the fork truck in such cases normally is towed backwards so that the usually frontally extending fork structure extends to the rear. This may result in excessive wear on gear surfaces which normally are operative only during reverse operation such as certain surfaces of the teeth on the ring gear and pinion gear of the differential in the drive axle of the fork truck.

The object of the present invention is to provide a reduction drive wheel construction which may be disconnected during towing operations as described and under other conditions, in order to avoid overspeeding of parts of the drive train and abnormal wear on normally little used surfaces of elements of the drive train.

In carrying out my invention in one preferred embodiment I provide a drive wheel arranged to be driven by a gear set disposed within the confines of the wheel and a drive axle shaft through which together with the gear set power is transmitted to the wheel. The sun gear of the gear set is rotatably mounted on the axle shaft and can be selectively connected to and disconnected from the axle shaft by means of a collar which is splined to the axle shaft for rotation therewith and slidable axially thereon.

In one modification of the invention, the sun gear is splined to the drive axle shaft for rotation therewith and is axially shiftable into and out of mesh with the pinion gears.

Figure 4:
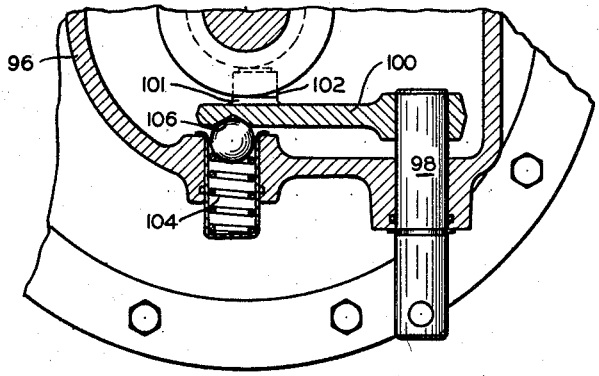

The above and other objects, features and advantages of my invention will become more readily apparent from the following detailed description when taken in conjunction with the drawings wherein:

FIGURE 1 is a vertical longitudinal cross-section of a preferred embodiment of my invention,
FIGURE 2 is a fragmentary cross-section taken along line 2—2 of FIGURE 1,
FIGURE 3 is a fragmentary cross-section showing a modification of my invention, and
FIGURE 4 is a fragmentary cross-section taken along line 4—4 of FIGURE 3.

Referring to FIGURE 1, the numeral 10 denotes a wheel rotatably mounted on an axle housing 12 and drivable by a drive axle shaft 14 through a gear set 16. Wheel 10 comprises a hub member 18 having a radially extending annular rim supporting portion 20 and an axially extending annular ring gear supporting portion 22. Hub member 18 is rotatably mounted on axle housing 12 by means of roller bearings 24 and 26. Secured to hub member 18 by means of a plurality of bolt and nut fasteners 28 is a rim member 30.

Gear set 16 is disposed within the confines of wheel 10 and includes a sun gear 32 which is rotatably mounted on axle shaft 14 and has an axially extending tooth clutch portion 34, the function of which will be explained hereinafter; a ring gear 36 fixedly secured to ring gear supporting portion 22 of hub 18 by means of a plurality of machine screws 38 and a pinion gear carrier 40 splined to axle housing 12 at 42 and held in place by means of a threaded retaining nut 44. Meshing with sun gear 32 and ring gear 36 are a plurality of pinion gears 46, preferably three in number. Each pinion gear 46 is rotatably mounted by means of needle bearings 48 on axially extending stub shaft 50 which is secured to pinion carrier 40, and is held in place by a pinned retaining ring 52.

As pointed out previously, sun gear 32 is rotatably mounted on drive axle 14, and therefore cannot transmit power from drive axle shaft 14 to wheel 10 unless secured to drive axle shaft 14. In order to secure sun gear 32 to drive axle 14 for rotation therewith and thereby transmit power from drive axle 14 through sun gear 32, an axially slidable collar 54 splined to drive axle 14 at 56 is provided. Collar 54 has an axially extending tooth clutch portion 58 disposed in facing relation with tooth clutch portion 34 on sun gear 32. Tooth clutch portions 34 and 58 cooperate with each other so that when they are actuated into meshing relation sun gear 32 is clutched to collar 54 and rotates therewith.

Referring now also to FIGURE 2, collar 54 is actuated axially by means of a control lever 60 which has a downwardly projecting lug 62 with a wear block 64 mounted thereon engaging an annular groove 66 in collar 54. Control lever 60 is pressed onto the lower end of a shaft 68 which is rotatably journalled in a cap 70 which is fixedly secured to hub portion 22 along with ring gear 36 by a plurality of machine screws 38. The end of shaft 68 opposite control lever 60 extends outwardly beyond cap 70 and is adapted to be operated by any suitable control mechanism to selectively actuate collar 54 toward or away from sun gear 32.

A spring loaded ball detent mechanism 72 is carried by cap 70 and cooperates with a pair of adjacent depressions 74 and 76 in the upper surface of control lever 60 to hold collar 54 in a disengaged position when the detent ball engages depression 74 and in which tooth clutch portions 34 and 58 are out of engagement and in an engaged position when the ball engages depression 76 and in which collar 54 is held in a position in which tooth clutch portions 34 and 58 are in engagement.

Referring to FIGURE 1, means for braking wheel 10 is provided by a conventional drum type friction brake 78. Brake 78 comprises an annular drum member 80 fixedly secured to hub member 18 of wheel 10 by a plurality of machine screws 82 and an internal expandable shoe assembly 84 secured to axle housing 12 by an annular support plate 86. The drum member 80 and shoe assembly 84 cooperate to brake wheel 10 upon expansion of shoe assembly 84 into frictional contact with drum member 80.

Turning to the operation of my invention, it will be assumed that it is desired to tow at road speed a fork truck having a pair of drive wheels embodying my invention. Prior to towing, tooth clutch portion 58 is disengaged from tooth clutch portion 34 by shifting collar 54 to the left as viewed in FIGURE 1. This leftward shifting of collar 54 can be accomplished, for example, by inserting a short rod into hole 88 in shaft 68 and then rotating shaft 68 counterclockwise as viewed from the top in FIGURE 2. Upon completion of this disconnecting operation for both wheels, they will be disengaged from their respective gear sets and the fork truck will be ready for towing. It will be noted at this point that during towing, rotation of rim member 30 will not cause drive axle shaft 14 to be driven, and therefore there will be no undesirable wear on the back sides of the differential gear teeth. When it is desirable upon arriving at a location to convert the drive wheels from a towing condition to a driving condition the disengaging procedure is merely reversed and collar 54 is moved to the right, thereby bringing tooth clutch portion 58 into engagement with tooth clutch portion 34. It will be appreciated that during either engaging or disengaging procedure that it is necessary for the wheel to be stationary.

FIGURE 3 shows a modification of my invention in which drive axle shaft 14 is selectively connectible to gear set 16 for transmitting power therethrough or disconnectible therefrom by means of a sun gear 90 which is splined to drive axle shaft 14 and axially slidable thereon into or out of mesh with pinion gears 46. Sun gear 90 has an elongated axially extending portion 92 in which an annular groove 94 is formed for a reason explained hereinafter.

Referring now also to FIGURE 4, a cap 96 is fixedly secured to hub portion 22 by a plurality of machine screws 38. Pivotally journalled in cap 96 is a shaft 98 which extends both inwardly and outwardly of cap 96. Pressed onto the inner end of shaft 98 is a control lever 100 which has an upwardly extending lug 101 upon which is mounted a wear block 102. The wear block 102 is disposed within groove 94 so that pivotal movement of control lever 100 on shaft 98 results in axial movement of sun gear 90. A spring loaded ball detent 104 is mounted in cap 96 and cooperates with a pair of depressions 106 and 108 in the underside of control lever 100 to hold sun gear 90 in or out of mesh with pinion gears 46.

The operation of the modification of my invention shown in FIGURES 3 and 4 is similar to the operation of the first embodiment described above, and entails actuating sun gear 90 axially along drive axle 14 by means of control lever 100 either into or out of mesh with pinion gears 46 for selectively engaging or disengaging gear set 16 from driving relation with drive axle shaft 14, as desired.

While I have disclosed certain preferred embodiments of my invention, I do not intend to be limited to this disclosure. Undoubtedly, modifications and other forms of my invention will occur to those skilled in the art which are within the true scope and spirit of my invention. Therefore I intend to be limited only by the following appended claims.

I claim:

1. In combination, a non-rotatable tubular axle housing, a rotatable wheel carried by said axle housing, a rotatable drive axle shaft disposed within said axle housing and extending past one end thereof, a gear set disposed within said wheel and operable to transmit power from said drive shaft to said wheel, said gear set including a sun gear rotatably mounted on said drive axle shaft, a collar secured to said drive axle for rotation therewith and slidable axially thereof, means for connecting said collar and sun gear for rotation together, said connecting means including an axially extending tooth clutch portion on said sun gear and an axially extending tooth clutch portion on said collar in facing relation with said first mentioned tooth clutch portion, said tooth clutch portions being arranged such that said second mentioned tooth clutch portion can be actuated selectively into and out of engagement with said first mentioned tooth clutch portion for selectively connecting said sun gear with said collar for rotation with said drive axle and disconnecting said sun gear from said collar, and means for selectively actuating said second mentioned tooth clutch portion into and out of engagement with said first mentioned tooth cluch portion, said actuating means including a cap member mounted on said wheel, a control shaft extending through said cap member and pivotally journaled therein, a lever arm secured to the inner end of said control shaft and engaging said second-mentioned clutch portion so that pivotal movement of said control shaft causes an axial movement of said second-mentioned clutch portion along said drive shaft and detent means disposed in said cap member and cooperating with said lever arm for maintaining said second-mentioned clutch portion in an engaged or disengaged position.

2. For use with a vehicle having a non-rotatable axle housing, a wheel rotatably mounted on the axle housing, a drive axle shaft disposed within the axle housing and extending past the outer end thereof a gear set disposed within said wheel, said gear set including a sun gear rotatably mounted on said drive axle shaft, a ring gear fixedly secured to said wheel, a pinion carrier fixedly secured to the axle housing and at least one pinion gear rotatably mounted on said pinion carrier and in mesh with said sun and ring gears, means for selectively connecting to and disconnecting from said drive axle shaft said sun gear, and means for actuating said connecting and disconnecting means, said actuating means including a cap member secured to said wheel, a control shaft extending through said cap member and pivotally journaled therein and a lever arm secured to one end of said control shaft and engaging said connecting and disconnecting means so that pivotal movement of said control shaft in one direction causes said sun gear to be connected to said drive shaft and pivotal movement in the other direction causes said sun gear to be disconnected from said drive shaft.

3. In combination, a non-rotatable axle housing, a rotatable axle shaft disposed within said axle housing and extending past the outer end thereof, a wheel rotatably mounted on said axle housing, a gear set disposed within said wheel and arranged to selectively transmit power between said axle shaft and said wheel or interrupt power transmission between said axle shaft and said wheel, said gear set including a ring gear fixedly secured to said wheel, a pinion gear carrier fixedly secured to said axle housing, a plurality of pinion gears rotatably mounted on said pinion carrier and in mesh with said ring gear and a sun gear splined to said axle shaft for rotation therewith and slidable axially thereof selectively into and out of mesh with said pinion gears, and means for selectively actuating said sun gear into and out of mesh with said pinion gears, said means including a cap member secured to said wheel, a control shaft extending through said cap member and pivotally journaled therein and a lever arm fixed to said control shaft and engaging said sun gear so that pivotal movement of said control shaft causes said sun gear to slide axially of said axle shaft.

4. In combination, a non-rotatable tubular axle housing, a rotatable drive axle shaft disposed within said axle housing and extending past the outer end thereof, a wheel rotatably mounted on said axle housing, a gear set disposed within said wheel and arranged to selectively transmit power between said drive axle shaft and said wheel or interrupt power transmission between said drive axle shaft and said wheel, said gear set including a ring gear, a plurality of pinion gears in mesh with said ring gear, and a sun gear splined to said drive axle shaft for rotation therewith and slidable axially thereof selectively into and out of mesh with said pinion gears, and means for actuating said sun gear into and out of mesh with said pinion gears, said means including a cap member fixedly connected to said wheel, a shaft rotatably journalled in said cap member and extending therethrough and a control lever fixedly secured to said shaft and operatively connected to said sun gear.

References Cited by the Examiner

UNITED STATES PATENTS

| | | | |
|---|---|---|---|
| 1,350,255 | 8/20 | Jessen | 74—391 |
| 1,417,798 | 5/22 | Cook et al. | 180—43 |
| 1,783,780 | 12/30 | Evans | 180—43 |
| 2,613,772 | 10/52 | Thurber | 74—377 X |
| 2,802,542 | 8/57 | Gerst | 180—75 |

FOREIGN PATENTS 874,338　4/42　France.

DON A. WAITE, *Primary Examiner*.
BROUGHTON G. DURHAM, *Examiner*.